July 31, 1945.  P. JEPSON  2,380,530
CONTINUOUS PEACH PITTER
Filed May 10, 1943   5 Sheets-Sheet 1
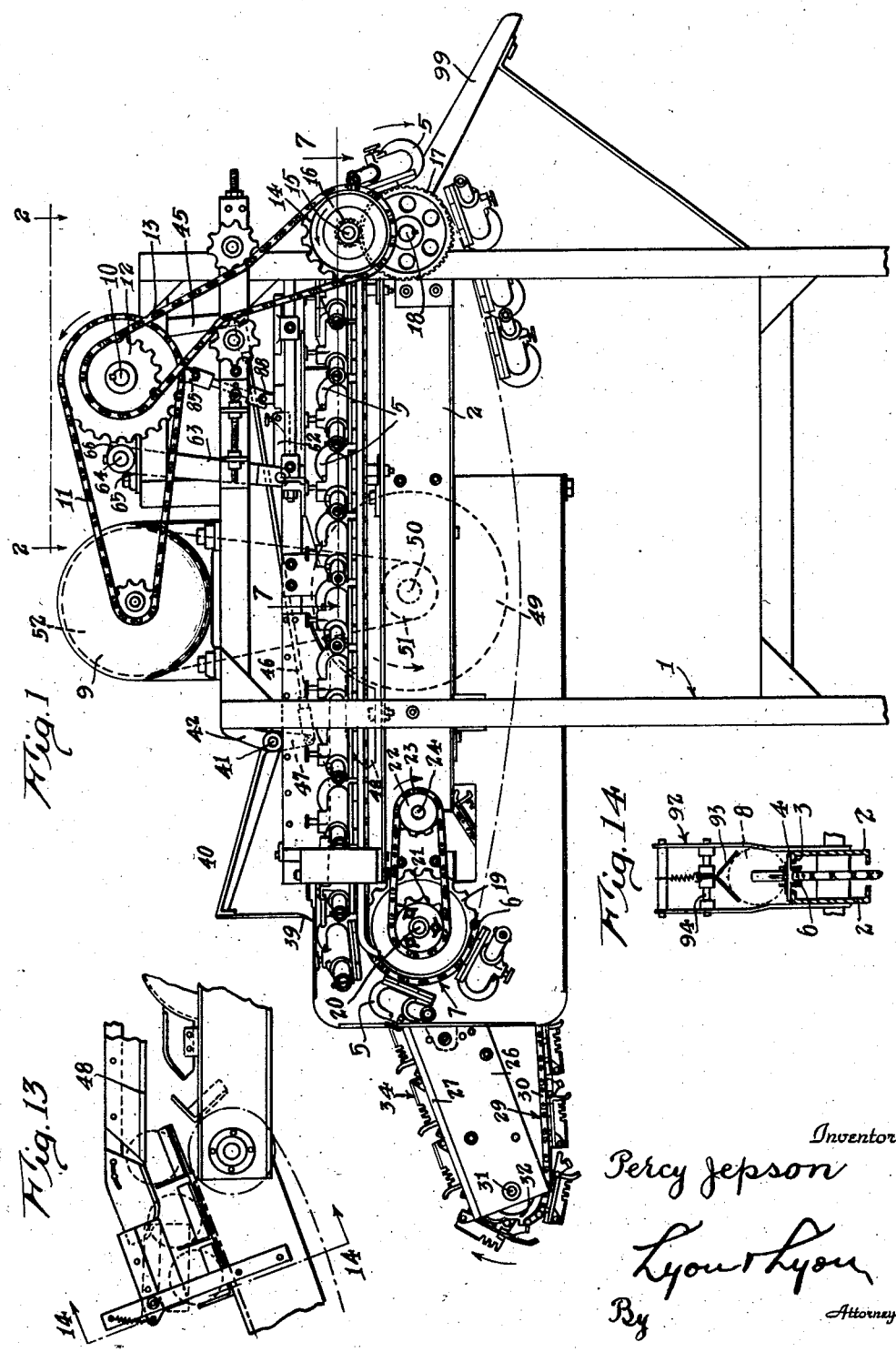
Inventor
Percy Jepson
By Lyon & Lyon
Attorneys July 31, 1945. P. JEPSON 2,380,530
CONTINUOUS PEACH PITTER
Filed May 10, 1943  5 Sheets-Sheet 2
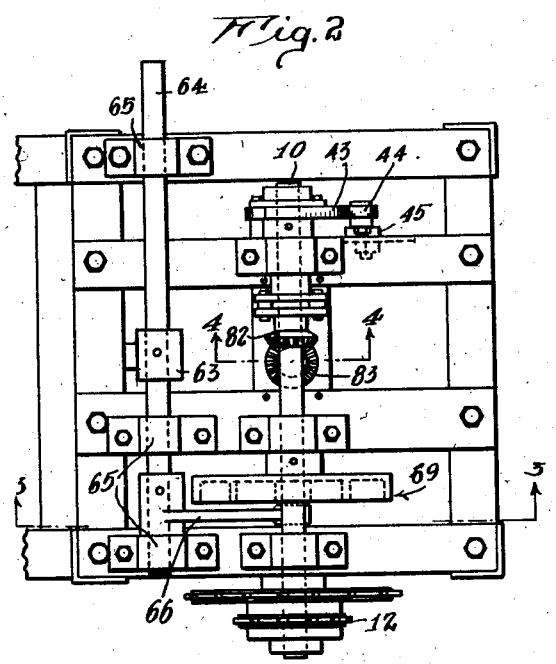
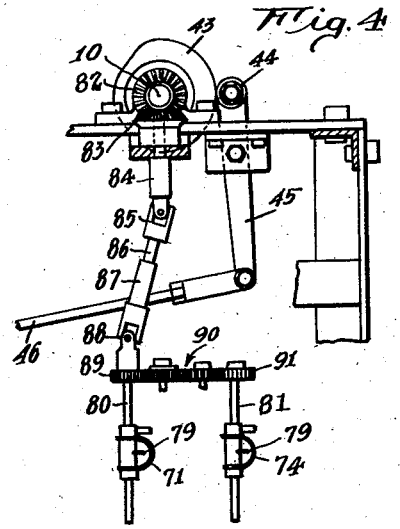
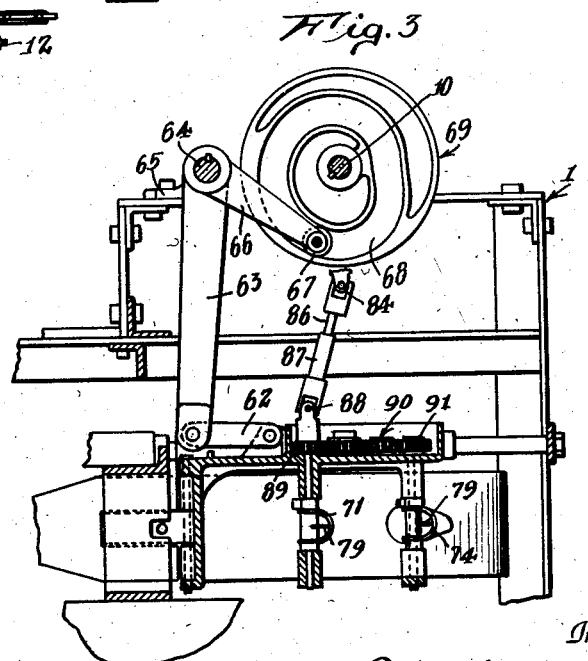
Inventor
Percy Jepson
By Lyon & Lyon
Attorneys July 31, 1945. P. JEPSON 2,380,530
CONTINUOUS PEACH PITTER
Filed May 10, 1943 5 Sheets-Sheet 3
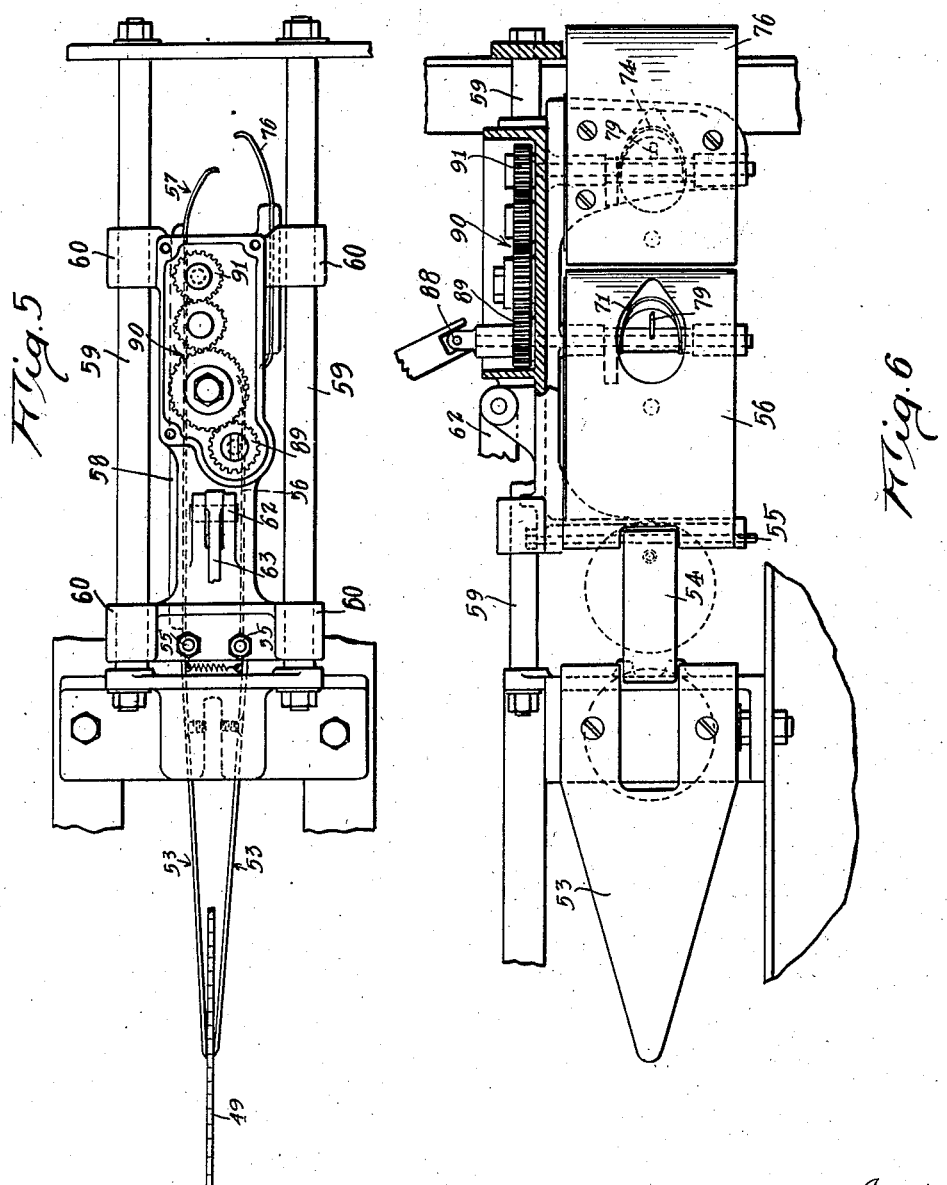
Inventor
Percy Jepson
By Lyon & Lyon
Attorneys July 31, 1945. P. JEPSON 2,380,530
CONTINUOUS PEACH PITTER
Filed May 10, 1943 5 Sheets-Sheet 4
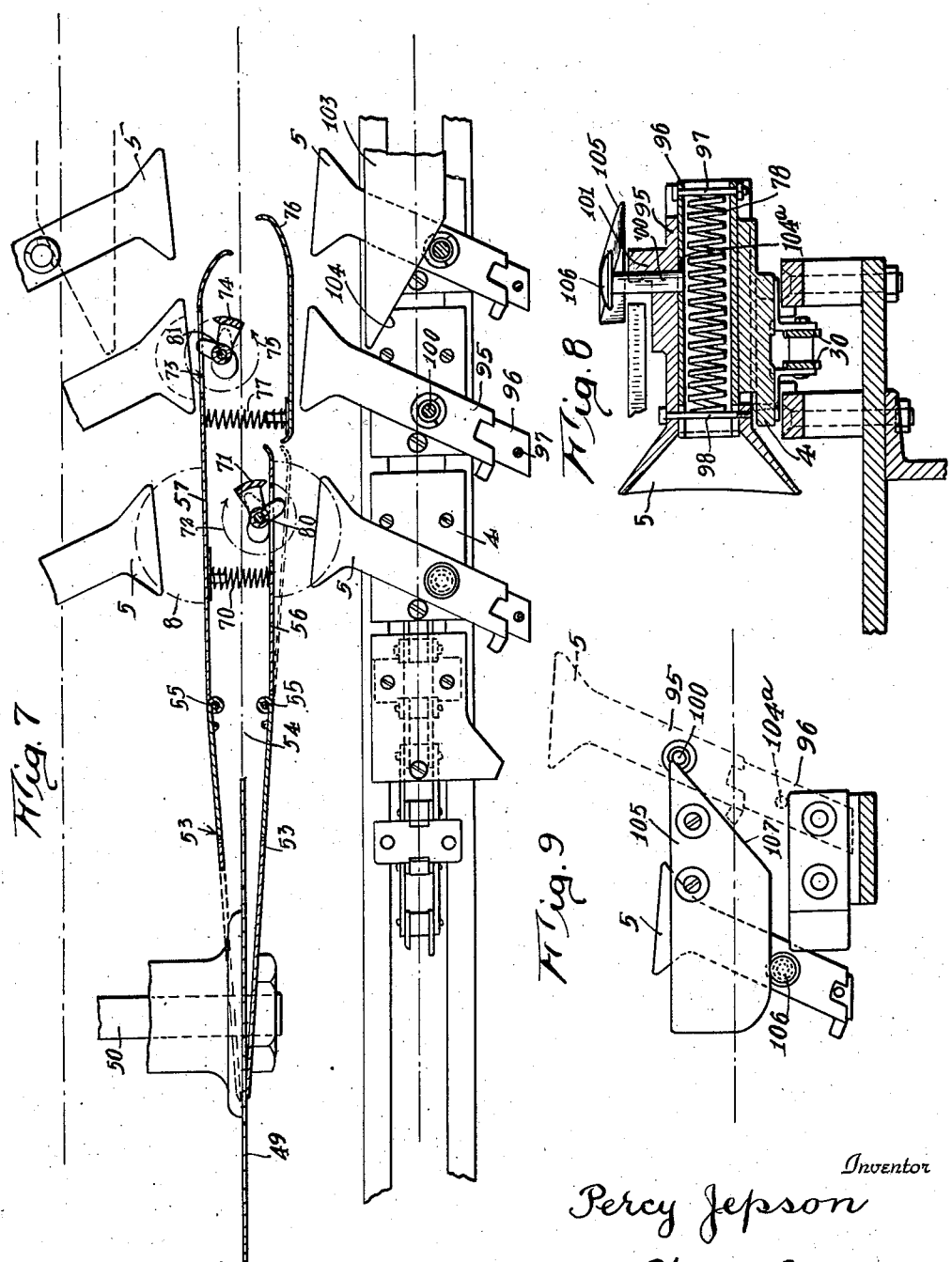
Inventor
Percy Jepson
By
Lyon & Lyon
Attorneys

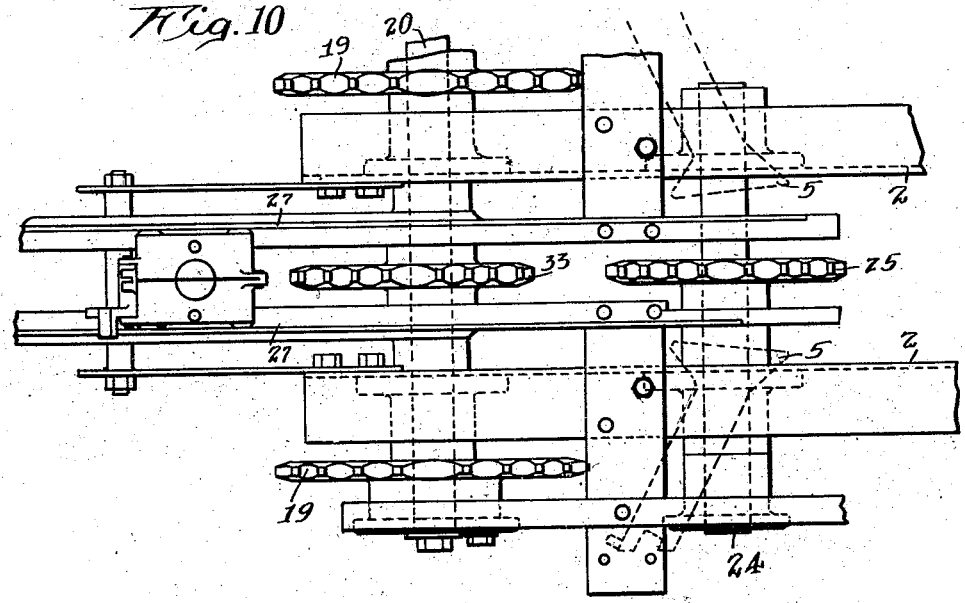
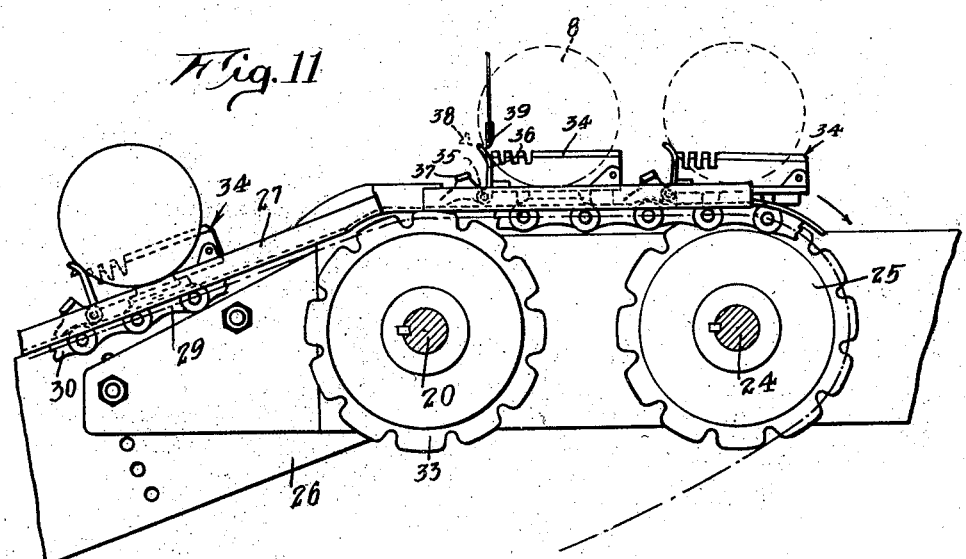
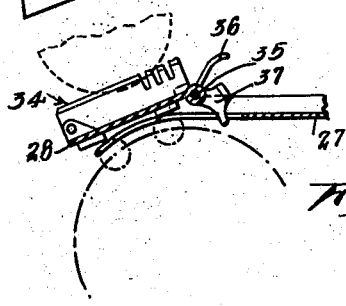

Patented July 31, 1945

2,380,530

UNITED STATES PATENT OFFICE 2,380,530

CONTINUOUS PEACH PITTER

Percy Jepson, Oakland, Calif., assignor to Pacific Machinery Company, San Francisco, Calif., a corporation of California Application May 10, 1943, Serial No. 486,325

9 Claims. (Cl. 146—28)

This invention relates to a continuous peach pitting machine, and more particularly to a continuous acting or operating machine applicable for the pitting of peaches or other similar fruit.

It is an object of this invention to provide a continuously operating peach or other fruit pitting or stoning machine into which the fruit to be pitted is fed and which machine operates to trim, halve and pit the fruit during the continuous movement of the fruit through the machine.

Another object of this invention is to provide a continuously running pitting machine having means to receive the fruit, means for gripping the fruit, means for trimming the gripped fruit, means for halving the fruit and its pit, and means for removing the halved pits from the halves of fruit.

Another object of this invention is to provide a continuously running fruit pitting machine which includes means for continuously moving the fruit through the machine in halves and means for successively pitting the halves of fruit during their travel through the machine.

Another object of this invention is to provide a fruit pitting machine of the continuously running type having means for successively pitting the two halves of a fruit, and means operatively associated with said pitting means for determining the depth of pitting in the flesh of the fruit around the pit half thereof.

Other objects and advantages of this invention it is believed will be apparent from the following detailed description of a preferred embodiment thereof as illustrated in the accompanying drawings.

In the drawings:

Figure 1 is a side elevation of a continuously operating fruit pitting, seeding or stoning machine embodying my invention.

Figure 2 is a fragmental sectional elevation taken substantially on the line 2—2 of Figure 1.

Figure 3 is a fragmental sectional elevation taken substantially on the line 3—3 of Figure 2.

Figure 4 is a fragmental sectional elevation taken substantially on the line 4—4 of Figure 2.

Figure 5 is a top plan view of an enlarged scale of the fruit pitting element of the continuously operating machine embodying my invention.

Figure 6 is a side elevation of the pitting means as illustrated in Figure 5.

Figure 7 is a fragmental sectional plan view taken substantially on the line 7—7 of Figure 1.

Figure 8 is a sectional elevation of the fruit holding and conveying means embodied in my invention.

Figure 9 is a diagrammatic view illustrating the cam control of the fruit holding means or cups.

Figure 10 is an enlarged fragmental plan view of the feeding section of the machine embodying my invention.

Figure 11 is a side elevation of the feed means as illustrated in Figure 10.

Figure 12 is a fragmental sectional elevation of the fruit impaling means embodied in my invention.

Figure 13 is a fragmental sectional elevation of the fruit feeding, guiding and impaling means adjacent the fruit halving means embodying my invention.

Figure 14 is a sectional end elevation taken substantially on the line 14—14 of Figure 13.

In the preferred embodiment of my invention as illustrated in the accompanying drawings, I indicates a frame to which there is secured a pair of spaced guide rails 2 provided with a longitudinally extending guide flange 3 for guiding the plates 4. The plates 4 carry the fruit cups 5. The plates 4 are secured to the links 6 of conveyer chains 7. There are two such conveyer chains 7 carrying companion cups 5 for engaging the fruit, i. e., the clingstone peach 8 over each half section thereof.

Means are provided for feeding the peaches into position to be engaged between the complementary cups 5 and for driving the conveyer chains 7 carrying the cups 5, which means preferably includes a suitable source of power such as an electric motor 9 mounted on the frame 1 for driving the countershaft 10 through the medium of a suitable drive chain 11. Secured to the countershaft 10 is a drive sprocket 12 and over which a chain 13 is trained to drive the idler sprocket 14 mounted on a stub shaft 15 journaled in a suitable bearing carried by the frame 1. Mounted on the stub shaft 15 is a pinion gear 16 which meshes with a spur gear 17 secured to the conveyer drive shaft 18. The conveyer drive shaft 18 is journaled in suitable bearings carried by the frame 1 and carries spaced chain sprockets over which and by which the conveyer chains 7 are driven.

The conveyor chains 7 are at their opposite end trained over driven sprockets 19 which are secured to a driven shaft 20 secured to bearing members carried by the outwardly extending ends of the guide rails 2. Secured to the shaft 20 is a feed means drive sprocket 21 which drives the sprocket 22 through the medium of a chain 23. The sprocket 22 is secured to a shaft 24 which shaft is likewise journaled in bearing members secured to the outwardly extending portion of the guide rails 2. Secured to the shaft 24 between the guide rails 2 is a feed chain sprocket 25. Secured to the ends of the guide rails 2 are downwardly inclined feed conveyer guide plates 26 which provide guide rails 27 for guiding the impaling blade plates 28. The plates 28 are secured at spaced points to a link 29 of the feed chain 30.

Carried in the lower end of the downwardly extending feed conveyor guide plates 26 is a shaft 31 carrying a sprocket 32 over which the feed chain 30 is trained.

Mounted on the shaft 20 intermediate the guide rails 2 is a guide sprocket 33 over which the feed chain 30 is also trained. This sprocket 33 is thus mounted at the point where the chain 30 begins its incline downwardly to the sprocket 32 providing an inclined feed section for the feeding of the fruit onto the impaling blades 34. The impaling blades 34 are secured to the impaling blade plates 28.

At the rear of the impaling blades there is pivotally mounted on a shaft 35 a stop 36 which is adapted to be engaged in the calyx of the peach as the peach is impaled upon the impaling blade 34 in the plane of suture with the blossom tip of the peach extending forwardly. Thus the calyx stop 36 provides for the centering of the peach calyx as the peach is impaled upon the feed conveyor, thus insuring that all fruit will be impaled in definite position on the impaling blade 34.

The stop 36 is loosely pivoted on its pivot pin 35 and is provided with an offset arm 37 which is adapted to engage the rails 27 to swing the stop into position at the rear edge of the impaling blade 34 when the impaling blade is in the position to receive the fruit. The fruit is conveyed on the impaling blade 34 up to position to be received between the cups 5 of the continuously operating conveyors 7.

Before the peaches are transferred from the impaling blades 34 to the cup 5, the tip 38 is removed from the peach by means of the tipping blade 39 which is mounted on an arm 40 to oscillate down and cut the tip from the peach as the peach is traveling on the feed conveyor. The arm 40 is mounted on a rocker shaft 41. The rocker shaft 41 is journaled in bearing members 42 carried by the frame 1 and is rocked by means of a cam 43 (Figure 4). The cam 43 is adapted to be engaged by a cam roller 44 secured on the end of the cam lever 45. The cam lever 45 is pivoted intermediate its length and is secured to a connecting rod 46. The connecting rod 46 is in turn secured to a lever 47. The lever 47 is in turn secured to the shaft 41. The cam 43 is secured to the end of the countershaft 10 and is driven thereby. Immediately beyond the tipping blade 39 is a centrally positioned stationary splitting blade 48 which is mounted centrally between the cups 5 in position to split the flesh of the peach in the plane of suture above the pit. This splitting blade 48 extends downward to a position between the cups 5 in position immediately above the pit of the peach as the pit is impaled upon the impaling blades 34. The impaling blades 34 have already formed a similar slit in the flesh of the fruit below the pit. As the fruit passes onto the split blade 48, it is gripped by the complementary cups 5 and transferred from the feed conveyor.

The fruit is moved forwardly of the machine by the opposed cups 5 to the halving saw 49 which is likewise mounted centrally between the rails 2 and provides the means for cutting the peach including the pit thereof into halves. The saw 49 is mounted upon a saw shaft 50 and this shaft is driven by means of a suitable belt and pulley connection 51 from the motor 9, the saw being driven at high speed by means of a large sprocket 52 mounted upon the motor shaft at the opposite end from the drive chain 11. As thus conveyed across the rotary saw 49, the peach, including the stone, is cut into two halves and the halves are retained in the cups 5 by means of retaining plates 53 which converge together over the saw blade 49 and are held in position of substantial contact with the blade of the saw 49. The plates 53 are mounted on a bracket carried by the end of a frame 54 which supports a stationary splitting blade 48 between the cups 5. As the two retaining plates 53 diverge from the saw blade 49, the two halves of the previously sawed peach separate from each other and pass onto spaced and apertured pitting blades 56, 57. The blades 56 and 57 are carried by the pitter frame 58. The pitter frame 58 is in turn slidably mounted on pitter frame bars 59, which bars pass through bosses 60 of the feed frame. The pitter frame 58 is reciprocated so that it travels forwardly with a speed equal to the speed in advancement of the cups 5 for the carrying out of each pitting operation for the removal of the pit from each split peach.

Thus the pitting frame moves forwardly with each peach and after carrying out the pitting operation, returns to the starting position and picks up another peach, again advancing at the same rate as the cups 5 so that the pitting of the peaches is carried forward while the fruit is progressing at an even rate through the machine. In order to accomplish this, the pitter frame is pivotally secured to a link 62 (Fig. 3) which link is secured to a rocker arm 63. The rocker arm 63 is in turn secured to a rocker shaft 64. The shaft 64 is journaled in bearings 65 to the frame 1. Secured to the shaft 64 is a rocker shaft cam arm 66 carrying at its opposed ends a cam roller 67. The cam roller 67 rides in an enclosed camway 68 formed at the cam wheel 69. The cam wheel 69 is in turn secured to and driven by the countershaft 10.

Pitting blades 56 and 57 are journaled on pivot pins 55 and are held yieldably toward each other by means of a compression spring 70 which yieldably acts to urge the blades apart. The blade 56 has a pitting aperture formed therethrough through which a pitting knife 71 revolves in the direction of the arrow 72 to cut the half pit from the peach in a manner which will hereinafter be specifically described. Pitting blade 57 is longer than the pitting blade 56 and has a pitting aperture 73 formed therein through which a pitting knife 74 is rotated in the direction of the arrow 75 to cut the half pit from the second half of the same fruit. Thus the two halves of the pit are cut from the halves of the fruit progressively as the fruit moves through the machine, enabling the blades 56 and 57 to be moved closely together and to operate independently of each other in effecting a close passing of the pitting knives 71 and 74 around the half pit of the fruit during the pitting operation.

In order to carry the first pitted half of the fruit forward after it has passed over the end of the pitting blade 56, an extension 76 is provided which is rigidly supported in the pitting frame 58. A compression spring 77 is interposed between the rigid plate 76 and the movable blade 57 which yieldably urges the blade 57 against the surface of the fruit carried in the cup 5. The spring means comprising the springs 70 and 77 likewise performs another function during the pitting operation and that is of allowing the fruit halves to move within the radius of the pitting knives 71 and 74 under the influence of the springs 78 acting to urge the cup 5 toward the pitting blades.

Carried by the shafts on which the pitting knives 71 and 74 are secured are pit finders 79 which act in advance of the pitting knives 71 and 74 to locate the pit of the fruit and thereby establish the point of entry of the pitting knives into the flesh of the fruit as determined by the size of the fruit pits or halves thereof.

The fruit pitting knife 71 and its accompanying finder 79 are secured to the drive shaft 80 while the pitting knife 74 and its finder 79 are secured to a driving shaft 81. These shafts 80 and 81 are driven in the following manner: Secured to the countershaft 10 is a spur gear 82 which meshes with the spur pinion 83 carried by the shaft 84. The shaft 84 is secured by a universal joint 85 to a slide shaft 86 which fits within a sleeve 87 so as to drive the sleeve 87. The sleeve 87 is in turn secured by means of a universal joint 88 to a shaft 80 for driving the pitting blade 71 and the pit finder 79. Secured to the shaft 80 is a pinion 89 which drives through a chain of gears 90 and pinion 91 secured to the pitter shaft 81. The universal connections 85 and 88 and slide shaft construction 86 and 87 permits the maintaining of a driving connection to the pitting knife shafts as the pitter frame is reciprocated back and forth in the machine during the pitting operations and the operations of returning to position to pick up another fruit.

In order to provide means for holding fruit down on the impaling blades 34 during the transfer to the conveyer cups 5, there is provided a hold-down means which may be as illustrated in Figure 14. As illustrated in Figure 14, there is a frame 92 secured to the spaced rails 2 and secured to this frame is a hold-down apron 93 formed of flexible material and operating against a cross-pin 94 to press upon the upper surface of the peach 8. The apron is split to accommodate peaches of different sizes.

Means are provided for actuating the cups 5, which cups may be of the construction and mode of operation as described in my Patent No. 2,257,341, granted September 30, 1941, for Fruit treating machine. As thus described the cups 5 are secured to the outer ends of sleeves 95 which are mounted upon hollow tubes 96. The springs 78 are positioned within the tubes 96 to bear against pins 97 and 98 carried by the tube 96 and sleeve 95, respectively.

The compression spring 78 normally urges the cup 5 outwardly or the sleeve 95 to slide along the tube 96. Cam means are provided for controlling the position of the cups 5 so that the cups 5 are spread apart after the pitting operation to permit the two pitted halves of fruit to discharge from the machine through chute 99. Thus the sleeve 95 for each cup 5 carries a cam pin 100 mounted in a cylindrical boss 101 formed on the sleeve 95. The side of the pin 100 forms a cam surface to engage a cam plate 103 which has an inclined cam surface 104 which acts to withdraw the cup 5 against the compression of the spring 78 as indicated in Figure 7. When the cup 5 is thus withdrawn, the pin 100 drops into a hole 104ª formed in the tube 96 retaining the cup in the retracted position as the conveyer returns the cups 5 to the position to pick up another peach from the feed conveyer. At this end of the machine there is mounted the cam plate 105 which engages under the head 106 of the pin 100 to lift the pin 100 out of the hole 104ª permitting the spring 78 to urge the cup 5 forwardly to a position to grip the peach carried on the impaling blade 34 of the feed conveyer.

A plate 105 provides an inclined cam surface 107 along which the side of the pin 100 slides during forward movement of the conveyer so that the cup 5 moves gently into position to pick up the fruit half.

The pit finder 79, as viewed in Figure 7, has its engaging point 79ª advanced in front of the cutting edge of the pitting knives 71 and 74, respectively, so as to pass through the kernel of the half pit and engage the inner surface of the pit shell, thereby determining the position of the pit with relation to the pitting knives before the pitting knives start to pass around the pit. As the points 79ª engage the inner surface of the pit, they act to force the blades 56 and 57 outward away from the pitting knives a distance determined by the point of engagement of the point 79ª with the inner surface of the shell. This outward forcing of the pit of course causes the fruit half to be forced outward and this outward motion is permitted by the compression of the spring 78 acting against the cups 5.

Having fully described my invention, it is to be understood that I do not wish to be limited to the details herein set forth, but my invention is of the full scope of the appended claims.

I claim:

1. The combination in a fruit pitting means of a pair of spaced conveyers moving in general parallel directions, means on each conveyer for holding halves of fruit, a pair of retaining plates engaging the cut surfaces of the fruit halves as they are held by said holding means, each of said retaining plates having a pitting aperture therein, one in advance of the other in the line of travel of the fruit halves carried by said conveyers, and pitting knives one for each aperture and said knives being spaced in the direction of travel of the fruit over the said apertured plates and being operable through said pitting apertures to cut the half pits from the fruit halves as they are moved to position over said apertures by said conveyers, and means for driving the pitting knives in timed relation with the conveyers so that the pit halves are successively cut from the fruit halves when positioned over the said plate apertures.

2. The combination in a fruit pitting means of a pair of spaced conveyers moving in general parallel directions, means on each conveyer for holding halves of fruit, a pair of retaining plates engaging the cut surfaces of the fruit halves as they are held by said holding means, each of said retaining plates having a pitting aperture therein, one in advance of the other in the line of travel of the fruit halves carried by said conveyers, and pitting knives operable through said pitting apertures to cut the half pits from the fruit halves as they are moved to position over said apertures by said conveyers, and means for moving the retaining plates and pitting knives forwardly with the conveyers during the pitting operation.

3. In a continuously operating fruit pitting machine, the combination of a feed conveyer having means thereon for impaling a peach in its plane of suture, conveyer means having fruit receiving cups carried thereby, means for actuating the feed conveyer and the cup conveyer in timed relation, means for actuating the cups to transfer the fruit from the impaling means to the cups, means mounted in the path of movement of the fruit as carried by the cups for cutting the fruit into halves, retaining plates engaging the cut surfaces of the fruit and over which the halves of fruit are moved by the cups, yieldable means for yieldably urging the retaining plates toward the cups, means for yieldably urging the cups toward the retaining plates, pitting apertures formed in the retaining plates one in advance of the other along the path of movement of the fruit, a pitting means frame, means for moving the pitting means frame along the path of movement of the fruit in timed relation with the movement of the fruit by the cup conveyer, and spaced pitting means adapted to pass through the pit apertures in the retaining plates to successively cut the halves of pits from the fruit halves during advancement of the halves by the cup conveyer.

4. In a fruit pitting machine, the combination of a pair of spaced conveyers, fruit holding means carried by the conveyer adapted to engage the halves of a fruit between them, a retaining plate having diverging sections over which the halves of the fruit are moved by the conveyers to separate the fruit halves, a pitting frame carrying apertured retaining plates engaging the cut surfaces of the fruit and having pitting apertures therein and said pitting frame carrying spaced pitting knives adapted to pass through the spaced pitting apertures formed in the movable retaining plates, and means for actuating said pitting frame to move the same into position to receive the fruit halves from the diverging retaining plates to a position where the halved fruits are located over the pitting apertures and for advancing the pitting frame to move the movable apertured pitting plates with the fruit as moved by the conveyer, and means whereby the pitting knives are operated to cut the pits from the fruit as the pitting frame moves forwardly with the fruit.

5. In a fruit pitting machine, the combination of means for supporting the halves of a fruit, fruit retaining plates engaging the cut surfaces of the fruit and having pitting apertures therein over which the fruit halves are adapted to be moved with their pits in registry with said apertures, a pair of pitting knives, one for each plate aperture, said knives being spaced in the direction of travel of the fruit over the plates, the apertures of the pitting plates being spaced apart in the path of movement of the fruit halves thereover, means for actuating said pitting knives to pass the same through the pitting apertures whereby the halves of the fruit are successively pitted as the fruit halves are successively passed over the apertures of the retaining plates, and means for driving the fruit half supporting means and the pitting knives in timed relation so that the pitting knives are continuously driven and operate to cut the half pits from the fruit halves when the fruit halves are positioned over the plate apertures.

6. In a fruit pitting machine, the combination of conveyer means having fruit holding means for holding a fruit from diametrically opposed sides, means for continuously driving the conveyer means, means mounted in the path of movement of the fruit for cutting the fruit into two halves in its plane of suture, diverging retaining plates engaging the cut surfaces of the fruit and adapted to separate the fruit halves, a pitting frame over which the fruit halves are adapted to pass, said pitting frame including retaining plates one for each fruit half, the retaining plates of the pitting frame having pitting apertures therein, the pitting aperture of one retaining plate being advanced along the line of path of travel of the fruit thereover in advance of the pitting aperture of the other plate, means for actuating the pitting frame to move along the path of the fruit as it is conveyed by the conveyer, said pitting frame having a pair of pitting knives one in advance of the other and adapted to pass through the pitting apertures formed in the retaining plates to cut the half pit from the fruit as the fruit halves are successively moved over the said pitting apertures.

7. In a fruit pitting machine, the combination of a feed conveyer having an upwardly inclined feed section, said feed conveyer having impaling blades mounted thereon, guide means for guiding the impaling blades, calyx engaging means carried by the conveyer and adapted to engage with the calyx of the fruit when the fruit is impaled upon the impaling blade, said calyx engaging means being pivotally connected with the impaling blade, and means operatively associated with the conveyer and adapted to engage the calyx engaging means to rotate the same on its pivot to calyx engaging position.

8. In a fruit pitting machine, the combination of a pitting knife adapted to cut a pit from the flesh of the fruit, means for continuously moving the fruit, means for continuously rotating the pitting knife in timed relation with the fruit moving means, and means for moving the fruit and pitting means together in the direction of travel of the fruit whereby the pit will be cut from the flesh of the fruit during travel of the fruit.

9. In a fruit pitting machine, the combination of a curved pitting knife, a plate having a pit aperture therein through which the pitting knife is operated, means for continuously advancing fruit over the apertured plate whereby the fruit is positioned with its pit in registry with the plate aperture, means for moving the apertured plate and pitting means in the direction of travel of the fruit, and means for continuously rotating the pitting knife in timed relation with the fruit advancing means whereby the fruit pit will be cut from the flesh of the fruit when the fruit pit is in registry with the plate aperture.

PERCY JEPSON.